(12) United States Patent
Shepelev et al.

(10) Patent No.: US 10,037,112 B2
(45) Date of Patent: Jul. 31, 2018

(54) SENSING AN ACTIVE DEVICE'S TRANSMISSION USING TIMING INTERLEAVED WITH DISPLAY UPDATES

(71) Applicant: SYNAPTICS INCORPORATED, San Jose, CA (US)

(72) Inventors: Petr Shepelev, Campbell, CA (US); Oscar Ayzenberg, Cupertino, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 142 days.

(21) Appl. No.: 14/870,251

(22) Filed: Sep. 30, 2015

(65) Prior Publication Data

US 2017/0090611 A1    Mar. 30, 2017

(51) Int. Cl.
    G06F 3/044 (2006.01)
    G09G 3/20 (2006.01)
    G06F 3/041 (2006.01)

(52) U.S. Cl.
    CPC ............ *G06F 3/044* (2013.01); *G06F 3/0416* (2013.01); *G09G 3/20* (2013.01); *G06F 3/0412* (2013.01)

(58) Field of Classification Search
    CPC ....... G06F 3/0412; G06F 3/0416; G06F 3/044
    See application file for complete search history.

(56) References Cited

U.S. PATENT DOCUMENTS

| | | |
|---|---|---|
| 4,087,625 A | 5/1978 | Dym et al. |
| 4,233,522 A | 11/1980 | Grummer et al. |
| 4,237,421 A | 12/1980 | Waldron |
| 4,264,903 A | 4/1981 | Bigelow |
| 4,293,987 A | 10/1981 | Gottbreht et al. |
| 4,484,026 A | 11/1984 | Thornburg |
| 4,492,958 A | 1/1985 | Minami |
| 4,550,221 A | 10/1985 | Mabusth |
| 4,550,310 A | 10/1985 | Yamaguchi et al. |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |

(Continued)

FOREIGN PATENT DOCUMENTS

| | | |
|---|---|---|
| CN | 2436978 Y | 6/2001 |
| CN | 1490713 A | 4/2004 |

(Continued)

*Primary Examiner* — Chun-Nan Lin
(74) *Attorney, Agent, or Firm* — Patterson + Sheridan, LLP

(57) ABSTRACT

Embodiments described herein include an input device with a plurality of sensor electrodes, where each sensor electrode includes at least one display electrode of a plurality of display electrodes, and where each display electrode is configured to be driven for display updating and capacitive sensing. The input device also includes a processing system configured to acquire sensor data using one or more sensor electrodes during one or more display blanking periods, where a first half sensing period occurs during a first display blanking period and a second half sensing period occurs during a second display blanking period. The processing system acquires sensor data using a first resulting signal from the first half sensing period and a second resulting signal from the second half sensing period.

20 Claims, 5 Drawing Sheets

(56) References Cited

U.S. PATENT DOCUMENTS

| | | |
|---|---|---|
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,093,655 A | 3/1992 | Tanioka et al. |
| 5,239,307 A | 8/1993 | Andermo |
| 5,341,233 A | 8/1994 | Tomoike et al. |
| 5,392,058 A | 2/1995 | Tagawa |
| 5,459,463 A | 10/1995 | Gruaz et al. |
| 5,463,388 A | 10/1995 | Boie et al. |
| 5,534,892 A | 7/1996 | Tagawa |
| 5,650,597 A | 7/1997 | Redmayne |
| 5,657,012 A | 8/1997 | Tait |
| 5,777,596 A | 7/1998 | Herbert |
| 5,841,078 A | 11/1998 | Miller et al. |
| 5,869,790 A | 2/1999 | Shigetaka et al. |
| 5,896,120 A | 4/1999 | Iguchi et al. |
| 6,054,979 A | 4/2000 | Sellers |
| 6,188,391 B1 | 2/2001 | Seely et al. |
| 6,219,113 B1 | 4/2001 | Takahara |
| 6,222,522 B1 | 4/2001 | Mathews et al. |
| 6,239,788 B1 | 5/2001 | Nohno et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,560,276 B1 | 5/2003 | Long et al. |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,031,886 B1 | 4/2006 | Hargreaves |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,633,566 B2 | 12/2009 | Utsunomiya et al. |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,859,521 B2 | 12/2010 | Hotelling et al. |
| 7,864,160 B2 | 1/2011 | Geaghan et al. |
| 7,876,309 B2 | 1/2011 | XiaoPing |
| 7,928,964 B2 | 4/2011 | Kolmykov-Zotov et al. |
| 7,973,771 B2 | 7/2011 | Geaghan |
| 7,977,953 B2 | 7/2011 | Lee |
| 7,986,152 B2 | 7/2011 | Philipp et al. |
| 8,018,440 B2 | 9/2011 | Townsend et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,243,027 B2 | 8/2012 | Hotelling et al. |
| 8,258,986 B2 | 9/2012 | Makovetskyy |
| 8,259,078 B2 | 9/2012 | Hotelling et al. |
| 8,278,571 B2 | 10/2012 | Orsley |
| 8,305,359 B2 | 11/2012 | Bolender et al. |
| 8,319,747 B2 | 11/2012 | Hotelling et al. |
| 8,482,536 B1 | 7/2013 | Young |
| 8,493,359 B2 | 7/2013 | Wright et al. |
| 8,521,791 B2 | 8/2013 | Chen et al. |
| 8,587,526 B2 | 11/2013 | Engelhardt et al. |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0095336 A1 | 5/2004 | Hong et al. |
| 2004/0125087 A1 | 7/2004 | Taylor et al. |
| 2004/0217945 A1 | 11/2004 | Miyamoto et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2005/0135492 A1 | 6/2005 | Jia et al. |
| 2006/0012575 A1 | 1/2006 | Knapp et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0114247 A1 | 6/2006 | Brown |
| 2006/0232600 A1 | 10/2006 | Kimura et al. |
| 2007/0008299 A1 | 1/2007 | Hristov |
| 2007/0026966 A1 | 2/2007 | Sanchez |
| 2007/0074914 A1 | 4/2007 | Geaghan et al. |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0262966 A1 | 11/2007 | Nishimura et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0018581 A1 | 1/2008 | Park et al. |
| 2008/0048989 A1 | 2/2008 | Yoon et al. |
| 2008/0055267 A1 | 3/2008 | Wu et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0074398 A1 | 3/2008 | Wright |
| 2008/0104655 A1 | 5/2008 | Hayward |
| 2008/0111795 A1 | 5/2008 | Bollinger |
| 2008/0117182 A1 | 5/2008 | Urn et al. |
| 2008/0144743 A1 | 6/2008 | Alderson et al. |
| 2008/0150901 A1 | 6/2008 | Lowles et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0180407 A1 | 7/2008 | Utsunomiya et al. |
| 2008/0218488 A1 | 9/2008 | Yang et al. |
| 2008/0245582 A1 | 10/2008 | Bytheway |

(56) References Cited

U.S. PATENT DOCUMENTS

| | | |
|---|---|---|
| 2008/0246723 A1 | 10/2008 | Baumbach |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309625 A1 | 12/2008 | Krah et al. |
| 2008/0309627 A1 | 12/2008 | Hotelling et al. |
| 2008/0309628 A1 | 12/2008 | Krah et al. |
| 2008/0309635 A1 | 12/2008 | Matsuo |
| 2009/0002337 A1 | 1/2009 | Chang |
| 2009/0002338 A1 | 1/2009 | Kinoshita et al. |
| 2009/0009194 A1 | 1/2009 | Seguine |
| 2009/0040191 A1 | 2/2009 | Tong et al. |
| 2009/0046077 A1 | 2/2009 | Tanaka et al. |
| 2009/0046205 A1 | 2/2009 | Strasser et al. |
| 2009/0079707 A1 | 3/2009 | Kaehler et al. |
| 2009/0091551 A1 | 4/2009 | Hotelling et al. |
| 2009/0095540 A1 | 4/2009 | Zachut et al. |
| 2009/0096757 A1 | 4/2009 | Hotelling et al. |
| 2009/0107737 A1 | 4/2009 | Reynolds et al. |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160461 A1 | 6/2009 | Zangl et al. |
| 2009/0160682 A1 | 6/2009 | Bolender et al. |
| 2009/0185100 A1 | 7/2009 | Matsuhira et al. |
| 2009/0195511 A1 | 8/2009 | Cites et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0256818 A1 | 10/2009 | Noguchi et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0001973 A1 | 1/2010 | Hotelling et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0019780 A1 | 1/2010 | Bulea |
| 2010/0026655 A1 | 2/2010 | Harley |
| 2010/0044122 A1 | 2/2010 | Sleeman et al. |
| 2010/0045635 A1 | 2/2010 | Soo |
| 2010/0053095 A1 | 3/2010 | Wu et al. |
| 2010/0053380 A1 | 3/2010 | Ise |
| 2010/0060591 A1 | 3/2010 | Yousefpor et al. |
| 2010/0066692 A1 | 3/2010 | Noguchi et al. |
| 2010/0085324 A1 | 4/2010 | Noguchi et al. |
| 2010/0090979 A1 | 4/2010 | Bae |
| 2010/0110040 A1 | 5/2010 | Kim et al. |
| 2010/0134422 A1 | 6/2010 | Borras |
| 2010/0140359 A1 | 6/2010 | Hamm et al. |
| 2010/0144391 A1 | 6/2010 | Chang et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0214247 A1 | 8/2010 | Tang et al. |
| 2010/0214262 A1 | 8/2010 | Ishizaki et al. |
| 2010/0220075 A1 | 9/2010 | Kuo et al. |
| 2010/0225612 A1 | 9/2010 | Ishizaki et al. |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289765 A1 | 11/2010 | Noguchi et al. |
| 2010/0289770 A1 | 11/2010 | Lee et al. |
| 2010/0291973 A1 | 11/2010 | Nakahara et al. |
| 2010/0295804 A1 | 11/2010 | Takeuchi et al. |
| 2010/0295824 A1 | 11/2010 | Noguchi et al. |
| 2010/0302201 A1 | 12/2010 | Ritter et al. |
| 2010/0302202 A1 | 12/2010 | Takeuchi et al. |
| 2010/0308844 A1 | 12/2010 | Day et al. |
| 2010/0309162 A1 | 12/2010 | Nakanishi et al. |
| 2010/0321043 A1 | 12/2010 | Philipp et al. |
| 2010/0321326 A1 | 12/2010 | Grunthaner et al. |
| 2010/0328239 A1 | 12/2010 | Harada et al. |
| 2010/0328255 A1 | 12/2010 | Ishizaki et al. |
| 2010/0328256 A1 | 12/2010 | Harada et al. |
| 2010/0328257 A1 | 12/2010 | Noguchi et al. |
| 2010/0328259 A1 | 12/2010 | Ishizaki et al. |
| 2010/0328274 A1 | 12/2010 | Noguchi et al. |
| 2010/0328291 A1 | 12/2010 | Ishizaki et al. |
| 2011/0006999 A1 | 1/2011 | Chang et al. |
| 2011/0007030 A1 | 1/2011 | Mo et al. |
| 2011/0012855 A1 | 1/2011 | Yeh et al. |
| 2011/0018841 A1 | 1/2011 | Hristov |
| 2011/0022351 A1 | 1/2011 | Philipp et al. |
| 2011/0025635 A1 | 2/2011 | Lee |
| 2011/0025639 A1 | 2/2011 | Trend et al. |
| 2011/0042152 A1 | 2/2011 | Wu |
| 2011/0048812 A1 | 3/2011 | Yilmaz |
| 2011/0048813 A1 | 3/2011 | Yilmaz |
| 2011/0050585 A1 | 3/2011 | Hotelling et al. |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0102361 A1 | 5/2011 | Philipp |
| 2011/0109579 A1 | 5/2011 | Wang et al. |
| 2011/0109590 A1 | 5/2011 | Park |
| 2011/0141051 A1 | 6/2011 | Ryu |
| 2011/0169770 A1 | 7/2011 | Mishina et al. |
| 2011/0187666 A1 | 8/2011 | Min |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0242444 A1 | 10/2011 | Song |
| 2011/0248949 A1 | 10/2011 | Chang et al. |
| 2011/0267300 A1 | 11/2011 | Serban et al. |
| 2011/0267305 A1 | 11/2011 | Shahparnia et al. |
| 2011/0273391 A1 | 11/2011 | Bae |
| 2011/0298746 A1 | 12/2011 | Hotelling |
| 2012/0038585 A1 | 2/2012 | Kim |
| 2012/0044171 A1 | 2/2012 | Lee et al. |
| 2012/0050216 A1 | 3/2012 | Kremin et al. |
| 2012/0056820 A1 | 3/2012 | Corbridge |
| 2012/0102191 A1 | 4/2012 | Rabii |
| 2012/0154340 A1 | 6/2012 | Vuppu et al. |
| 2012/0182238 A1 | 7/2012 | Lee |
| 2012/0218199 A1 | 8/2012 | Kim et al. |
| 2012/0306744 A1 | 12/2012 | Hoffman et al. |
| 2012/0313901 A1 | 12/2012 | Monson |
| 2012/0327041 A1 | 12/2012 | Harley et al. |
| 2013/0057507 A1 | 3/2013 | Shin et al. |
| 2013/0057511 A1* | 3/2013 | Shepelev ............ G06F 3/044 345/174 |
| 2013/0088372 A1 | 4/2013 | Lundstrum et al. |
| 2013/0162570 A1 | 6/2013 | Shin et al. |
| 2013/0194229 A1* | 8/2013 | Sabo ............ G06F 3/044 345/174 |
| 2013/0215075 A1 | 8/2013 | Lee et al. |
| 2013/0265271 A1 | 10/2013 | Hsu et al. |
| 2013/0300696 A1 | 11/2013 | Haran et al. |

(56) References Cited

U.S. PATENT DOCUMENTS

| | | | |
|---|---|---|---|
| 2013/0321296 | A1 | 12/2013 | Lee et al. |
| 2014/0028634 | A1 | 1/2014 | Krah et al. |
| 2014/0184554 | A1 | 7/2014 | Walley |
| 2015/0116266 | A1* | 4/2015 | Inoue ............... G06F 3/0416 345/174 |
| 2016/0092010 | A1* | 3/2016 | Agarwal ............. G06F 3/0412 345/173 |

FOREIGN PATENT DOCUMENTS

| | | |
|---|---|---|
| CN | 1940842 A | 4/2007 |
| CN | 101051256 A | 10/2007 |
| CN | 1940842 B | 5/2010 |
| EP | 0810540 A2 | 12/1997 |
| EP | 0919945 A2 | 6/1999 |
| EP | 0977159 A1 | 2/2000 |
| EP | 1892605 A2 | 2/2008 |
| EP | 1936479 A1 | 6/2008 |
| EP | 1892605 A3 | 7/2008 |
| EP | 2330493 A2 | 6/2011 |
| JP | 2002-215330 A | 8/2002 |
| JP | 2002-268768 A | 9/2002 |
| JP | 2002268786 A | 9/2002 |
| JP | 2006106853 A | 4/2006 |
| JP | 2007334606 A | 12/2007 |
| JP | 2008090623 A | 4/2008 |
| JP | 2010072581 A | 4/2010 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| JP | 2014066654 A | 4/2014 |
| KR | 10110118065 | 1/2012 |
| TW | 200945147 A | 11/2009 |
| WO | WO-86/06551 A1 | 11/1986 |
| WO | WO-0057344 A1 | 9/2000 |
| WO | WO-0127868 A1 | 4/2001 |
| WO | WO-03019346 A1 | 3/2003 |
| WO | WO-2004045905 A2 | 6/2004 |
| WO | WO-2004046905 A3 | 8/2004 |
| WO | WO-2006054585 A1 | 5/2006 |
| WO | WO-2007003108 A1 | 1/2007 |
| WO | WO-2007012256 A1 | 2/2007 |
| WO | WO-2007102238 A1 | 9/2007 |
| WO | WO-2008050507 A1 | 5/2008 |
| WO | WO-2010009655 A1 | 1/2010 |
| WO | WO-2010117946 A2 | 10/2010 |
| WO | WO-2010137727 A1 | 12/2010 |
| WO | WO-20100136932 A1 | 12/2010 |
| WO | WO-2013024225 A1 | 2/2013 |

* cited by examiner

SENSING AN ACTIVE DEVICE'S TRANSMISSION USING TIMING INTERLEAVED WITH DISPLAY UPDATES

BACKGROUND

Field of the Disclosure

Embodiments of the present invention generally relate to a method and apparatus for touch sensing, and more specifically, to sensing an active device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments described herein include a processing system for a capacitive sensing device, including a sensor module comprising sensor circuitry configured to acquire sensor data using one or more sensor electrodes of a plurality of sensor electrodes during one or more display blanking periods. A first half sensing period occurs during a first display blanking period and a second half sensing period occurs during a second display blanking period. A display update period occurs between the first display blanking period and the second display blanking period. Each sensor electrode includes at least one display electrode of a plurality of display electrodes, and each display electrode is configured to be driven for display updating and capacitive sensing. The sensor module acquires sensor data using a first resulting signal from the first half sensing period and a second resulting signal from the second half sensing period.

In another embodiment, an input device includes a plurality of sensor electrodes, where each sensor electrode comprises at least one display electrode of a display, and where each display electrode is configured to be driven for display updating and capacitive sensing. The input device also includes a processing system configured to acquire sensor data using one or more sensor electrodes during a first display blanking period while in a reset mode. The processing system is also configured to remain in the reset mode during a display update period following the first display blanking period. The processing system is further configured to acquire sensor data using one or more sensor electrodes during a second display blanking period following the display update period while remaining in the reset mode. The processing system is also configured to integrate the acquired sensor data during the first and second display blanking periods to detect a communication signal from an active device, In another embodiment, a method for operating an input device includes acquiring sensor data using a plurality of sensor electrodes during a first display blanking period, where an analog front end associated with the plurality of sensor electrodes is in a reset mode during the first display blanking period. The method also includes updating one or more display lines after the first display blanking period, where the analog front end remains in the reset mode after the first display blanking period. The method further includes acquiring sensor data using the plurality of sensor electrodes during a second display blanking period, where the analog front end remains in the reset mode during the second display blanking period. The method also includes integrating sensor data acquired during the first and second display blanking periods to detect a communication signal from an active device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
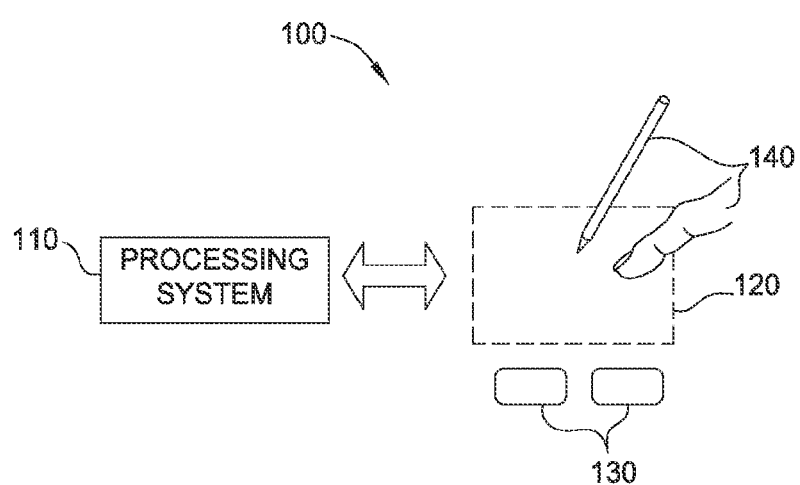
FIG. 1 is a block diagram of a system that includes an input device according to an embodiment.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously provide interleaved touch sensing and display updates in such a way that a blanking period allows integration for sensing a signal from an active device. The interleaving of touch sensing and display updates does not produce an additional modulation, so there are no new harmonics at an analog front-end (AFE) used to measure charge during capacitive sensing.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
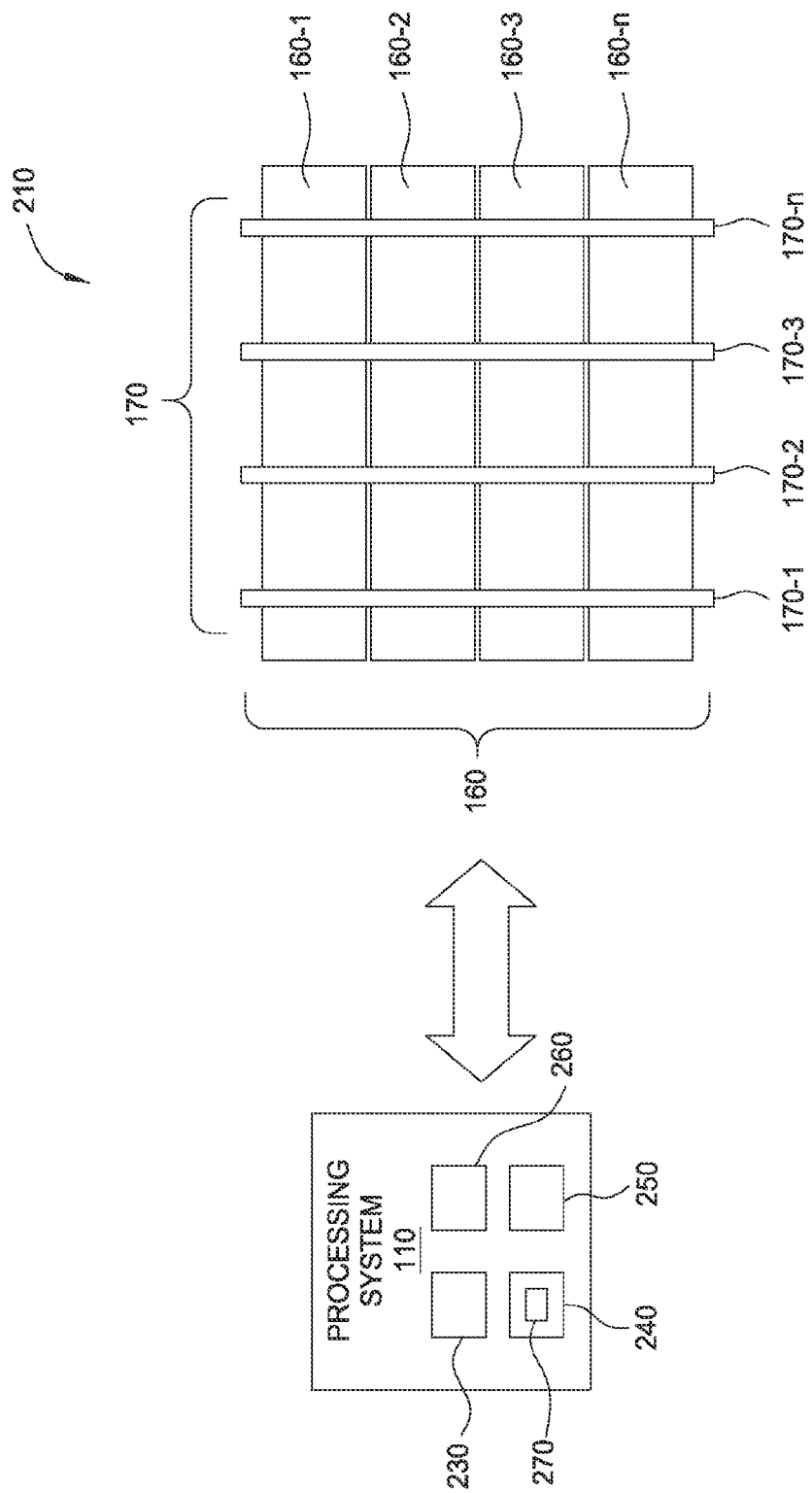
FIG. 2 is an example sensor electrode pattern according to an embodiment.

FIG. 2 illustrates a system 200 including a processing system 110 and a portion of an example sensor electrode pattern configured to sense in a sensing region associated with the pattern, according to some embodiments. For clarity of illustration and description, FIG. 2 shows a pattern of simple rectangles illustrating sensor electrodes, and does not show various components. This sensor electrode pattern comprises a first plurality of sensor electrodes 160 (160-1, 160-2, 160-3, ... 160-n), and a second plurality of sensor electrodes 170 (170-1, 170-2, 170-3, ... 170-n) disposed over the plurality of sensor electrodes 160.

Sensor electrodes 160 and sensor electrodes 170 are typically ohmically isolated from each other. That is, one or more insulators separate sensor electrodes 160 and sensor electrodes 170 and prevent them from electrically shorting to each other. In some embodiments, sensor electrodes 160 and sensor electrodes 170 are separated by insulative material disposed between them at cross-over areas; in such constructions, the sensor electrodes 160 and/or sensor electrodes 170 may be formed with jumpers connecting different portions of the same electrode. In some embodiments, sensor electrodes 160 and sensor electrodes 170 are separated by one or more layers of insulative material. In some other embodiments, sensor electrodes 160 and sensor electrodes 170 are separated by one or more substrates; for example, they may be disposed on opposite sides of the same substrate, or on different substrates that are laminated together.

In other embodiments, one or more of sensor electrodes 160 or 170 are disposed on the same side or surface of the common substrate and are isolated from each other in the sensing region 120. The sensor electrodes 160 and 170 may be disposed in a matrix array where each sensor electrode may be referred to as a matrix sensor electrode. Each sensor electrode may be substantially similar size and/or shape. In one embodiment, one or more sensor electrodes of the matrix array of sensor electrodes 160 and 170 may vary in at least one of size and shape. Each sensor electrode of the matrix array may correspond to a pixel of a capacitive image. Further, two or more sensor electrodes of the matrix array may correspond to a pixel of a capacitive image. In various embodiments, each sensor electrode of the matrix array may be coupled to a separate capacitive routing trace of a plurality of capacitive routing traces. In various embodiments, the sensor electrodes 160 or 170 comprise one or more gird electrodes disposed between at least two sensor electrodes. The grid electrode and at least one sensor electrode may be disposed on a common side of a substrate, different sides of a common substrate and/or on different substrates. In one or more embodiments, the sensor electrodes and the grid electrode(s) may encompass an entire voltage electrode of a display device. Although the sensor electrodes may be electrically isolated on the substrate, the electrodes may be coupled together outside of the sensing region 120—e.g., in a connection region. In one embodiment, a floating electrode may be disposed between the grid electrode and the sensor electrodes. In one particular embodiment, the floating electrode, the grid electrode and the sensor electrode comprise the entirety of a common electrode of a display device.

The areas of localized capacitive coupling between sensor electrodes 160 and sensor electrodes 170 may be termed "capacitive pixels." The capacitive coupling between the sensor electrodes 160 and sensor electrodes 170 change with the proximity and motion of input objects in the sensing region associated with the sensor electrodes 160 and sensor electrodes 170.

In some embodiments, the sensor pattern is "scanned" to determine these capacitive couplings. That is, the sensor electrodes 160 are driven to transmit transmitter signals. Transmitters may be operated such that one sensor electrode transmits at one time, or multiple sensor electrodes transmit at the same time. Where multiple sensor electrodes transmit simultaneously, these multiple sensor electrodes may transmit the same transmitter signal and effectively produce an effectively larger sensor electrode, or these multiple sensor electrodes may transmit different transmitter signals. For example, multiple sensor electrodes may transmit different transmitter signals according to one or more coding schemes that enable their combined effects on the resulting signals of sensor electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, sensor electrodes 160 comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each sensor electrode 160 comprises one or more common electrodes. In other embodiments, at least two sensor electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

Processing system 110 may include a driver module 230, a sensor module 240, a determination module 250, and an optional memory 260. The processing system 110 is coupled to sensor electrodes 170 and sensor electrodes 160 through a plurality of conductive routing traces (not shown in FIG. 2).

The sensor module 240 is coupled to the plurality of sensor electrodes 170 and configured to receive resulting signals indicative of input (or lack of input) in the sensing region 120 and/or of environmental interference. The sensor module 240 may also be configured to pass the resulting signals to the determination module 250 for determining the presence of an input object and/or to the optional memory 260 for storage. Sensor module 240 may also drive sensor electrodes. In various embodiments, the IC of the processing system 110 may be coupled to drivers for driving the sensor electrodes 160. The drivers may be fabricated using thin-film-transistors (TFT) and may comprise switches, combinatorial logic, multiplexers, and other selection and control logic.

The driver module 230, which includes driver circuitry, included in the processing system 110 may be configured for updating images on the display screen of a display device (not shown). For example, the driver circuitry may include display circuitry and/or sensor circuitry configured to apply one or more pixel voltages to the display pixel electrodes through pixel source drivers. The display and/or sensor circuitry may also be configured to apply one or more common drive voltages to the common electrodes to update the display screen. In addition, the processing system 110 is configured to operate the common electrodes as transmitter electrodes for input sensing by driving transmitter signals onto the common electrodes.

The processing system 110 may be implemented with one or more ICs to control the various components in the input device. For example, the functions of the IC of the processing system 110 may be implemented in more than one integrated circuit that can control the display module elements (e.g., common electrodes) and drive transmitter signals and/or receive resulting signals received from the array of sensing elements. In embodiments where there is more than one IC of the processing system 110, communications between separate processing system ICs 110 may be achieved through a synchronization mechanism, which sequences the signals provided to the sensor electrodes 160. Alternatively the synchronization mechanism may be internal to any one of the ICs.

Processing system 110 may also comprise a receiver 270 that interfaces sensors to other components. The receiver 270 may comprise an AFE in some embodiments, and will be referred to as AFE 270 in this example embodiment for convenience. Other receiver implementations may be used in other embodiments. The AFE 270 may be embodied in sensor module 240 or in one or more other components of processing system 110. A duration of a reset period associated with the AFE 270 can be adjusted or selected according to the specific timing required to implement embodiments of this disclosure. As one example, described in further detail below, an AFE 270 can remain in a reset mode during display update periods in order to detect a signal transmitted from an active device. The AFE 270 may be referred to as a receiver in certain embodiments.

In some embodiments, the input object 140 illustrated in FIG. 1 comprises an active device, such as an active pen. An active device transmits a signal during a period of time that is often asynchronous to the refresh of the display screen. The duration of the transmission cycle of the communication signal generated by the active device may be longer than a desired blanking period. In an input device 100 where touch sensing is integrated with a display, touch sensing is often performed synchronous to the display timing. That is, periods of touch sensing are interleaved with periods of updating the display.

The periods of touch sensing occur during display blanking periods, which are periods of time where the display is not being updated. Blanking periods can vary in size in various embodiments. One method for listening for a signal from an active device comprises using a long blanking period that is proportional to the transmitting frequency of the active device. However, the display cannot be updated during the long blanking periods, which reduces the usability of the display. Embodiments described herein interleave more frequent display updates with shorter blanking periods. Then, the signal from the active device can be integrated over multiple sensing periods. An AFE 270 associated with sensor electrodes remains in a reset stage during periods of display updating, which allows integration of the signal from the active device. The AFE 270 can remain in the reset stage as long as necessary to detect a signal from the active device.

Figure 3:
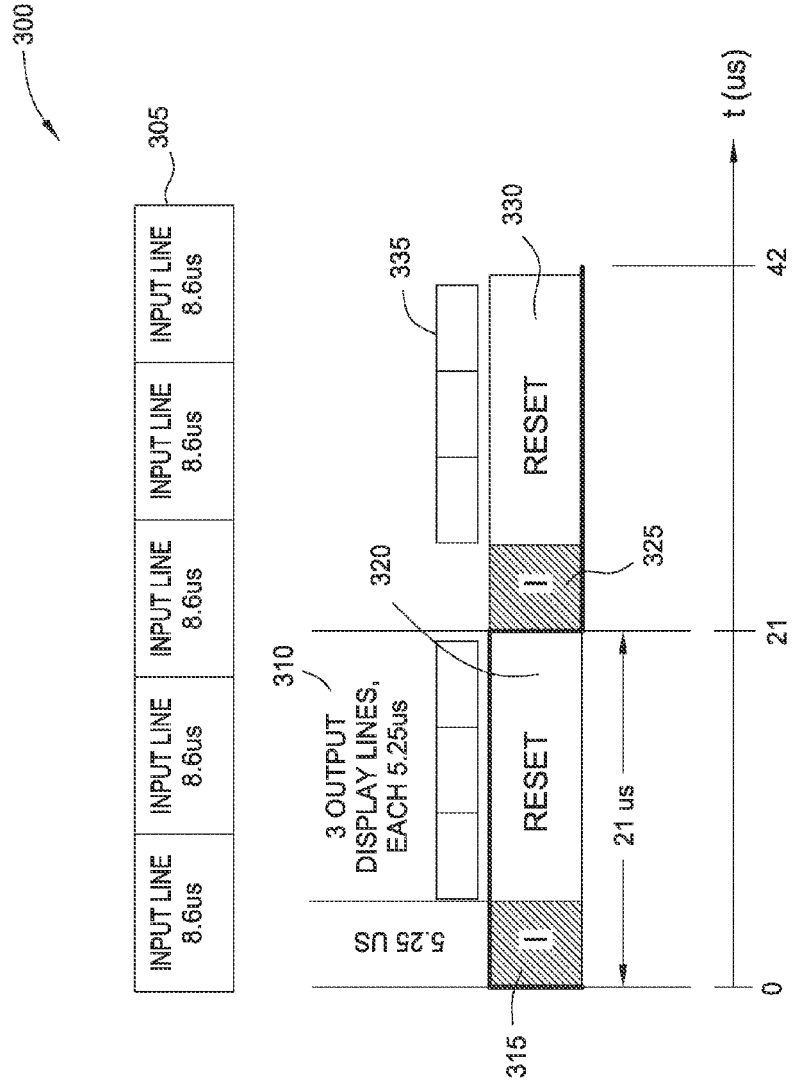
FIG. 3 illustrates an example timing sequence according to an example embodiment.

FIG. 3 illustrates an example timing sequence 300 according to one example embodiment. The timing numbers illustrated in FIG. 3 are merely one example corresponding to a high-definition resolution display; any appropriate timing numbers may be used in other embodiments. Input lines 305 are display lines that are input to a display driver (not illustrated). As shown, each input line 305 is approximately 8.6 μs in this example. This timing corresponds to full high-definition resolution (1920×1080 pixels and 60 frames per second).

Timing sequence 300 comprises full sensing periods that can be subdivided into half sensing periods. In this example, timing sequence 300 comprises a full sensing period of 42 μs, and two half sensing periods of 21 μs each. Each half sensing period includes a display blanking period (labeled/in FIG. 3). Two display blanking periods 315 and 325 are illustrated. The display blanking period is approximately 5.25 μs. Each half sensing period also includes a reset period. Two reset periods, 320 and 330, are illustrated. During each reset period, three display lines may be output, with the time for outputting each display line approximately 5.25 μs. Output display lines 310 and 335 are illustrated in FIG. 3.

The half sensing period in timing sequence 300 is shown as 21 μs long. During the display blanking periods/(315 and 325), the AFE 270 is prepared to receive a signal (i.e., acquire sensor data) from sensor electrodes in order to sense the signal transmitted from the active device. In this example, the duration of the transmission cycle of the communication signal generated by the active device is longer than 21 μs. Therefore, to capture the signal from the active device, the AFE 270 needs to integrate the signal over multiple half sensing periods. During the reset periods (320 and 330), the AFE 270 remains in a reset state while the display is being updated. Remaining in the reset state allows the AFE 270 to integrate the resulting signals from the sensor electrodes over multiple display blanking periods in order to detect the signal transmitted from the active device. The AFE 270 may integrate the resulting signals over any number of display blanking periods, not just two display blanking periods as shown in this example.

The reset periods 320 and 330 may be longer or shorter in duration in other embodiments. While three output display lines (310 and 335) are shown for each 21 μs half sensing period in this example, the number of output lines in each reset period could vary in other embodiments. The number of output lines for each half-sensing period could change depending on the transmission frequency of the active device, for example.

The timing sequence described with respect to FIG. 3 could also be utilized for sensing touch, in addition to or instead of sensing a transmission or acquiring sensor data from an active device. One benefit for using this timing with touch sensing is a reduced display buffer size. For a timing sequence with a long blanking period, a large buffer is required to store display updates that occur during the blanking period. With shorter display blanking periods, a smaller buffer can be utilized.

Figure 4:
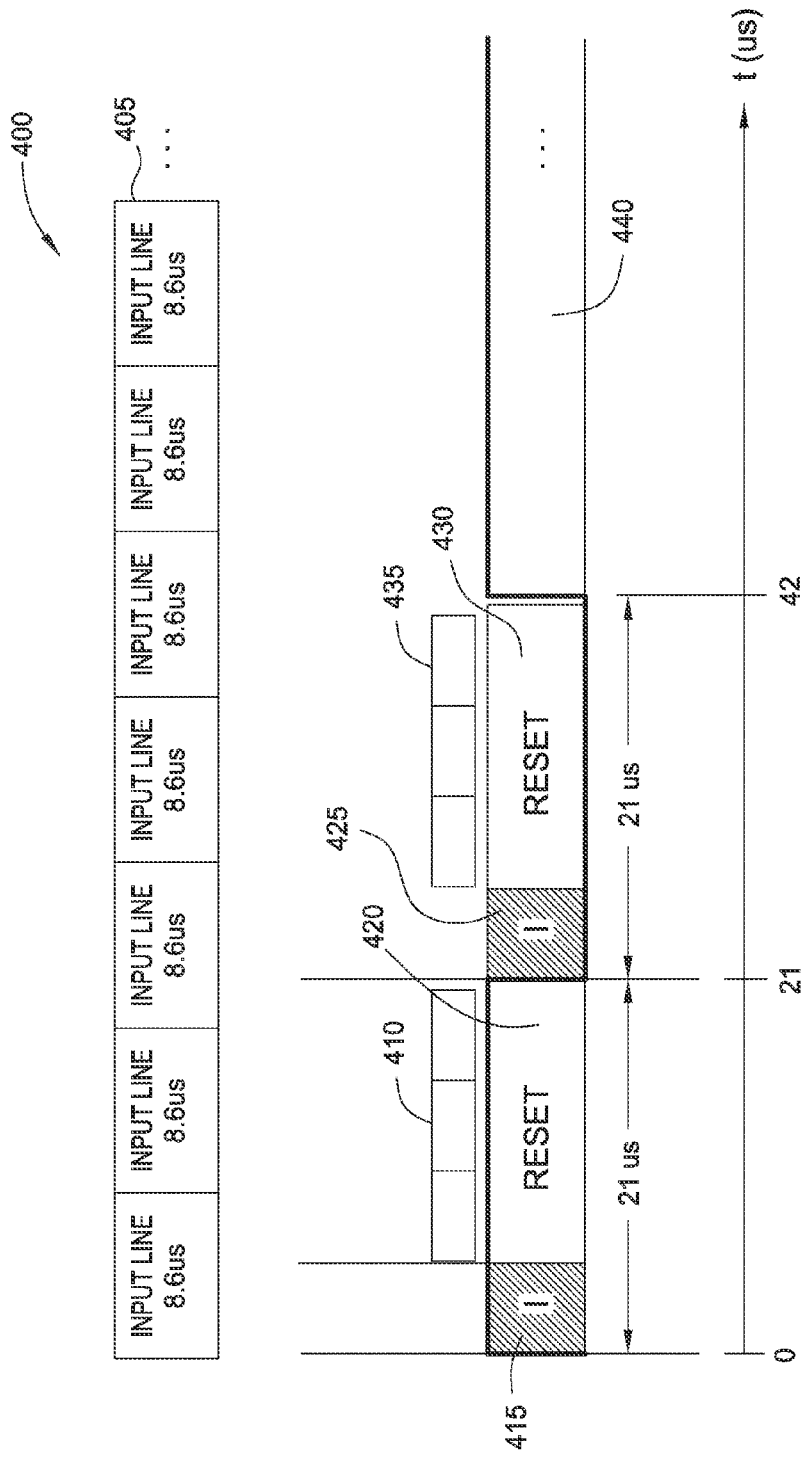
FIG. 4 illustrates another example timing sequence according to an example embodiment.

FIG. 4 illustrates an example timing sequence 400 according to another embodiment. The timing numbers illustrated in FIG. 4 are merely one example corresponding to a high-definition resolution display; any appropriate timing numbers may be used in other embodiments. Display input lines 405 and display output lines 410 and 435 are equivalent to those elements discussed above with respect to FIG. 3. Timing sequence 400 further includes display blanking periods 415 and 425 and reset periods 420 and 430. These operate similar to the blanking periods and reset periods discussed above with respect to FIG. 3.

Timing sequence 400 illustrates the short blanking periods described above with respect to FIG. 3 in combination with one or more longer blanking periods 440. Blanking period 440 could comprise a horizontal or vertical blanking period in some embodiments. As an example, a first duration of time could be allocated for sensing an active device utilizing any number of the shorter blanking periods, like blanking periods 415 and 425. This is shown as the first 42 μs in timing sequence 400. Then, after 42 μs, a second duration of time could be allocated for touch sensing during longer blanking periods, such as horizontal blanking (hblank), long horizontal blanking (long hblank), or vertical blanking (vblank) periods. Horizontal and vertical blanking periods may also be used for various display operations, such as signifying new lines or new frames, respectively. Note that 42 μs for the active device sensing period is just an example; the first duration and the second duration can each be any suitable length. In one embodiment, half of the timing sequence may be utilized for sensing an active device and half of the timing sequence may be utilized for touch sensing. The AFE 270 would be configured to integrate and/or receive the different signals (either touch signals or signal from an active device) in accordance with whichever timing sequence is being utilized.

Figure 5:
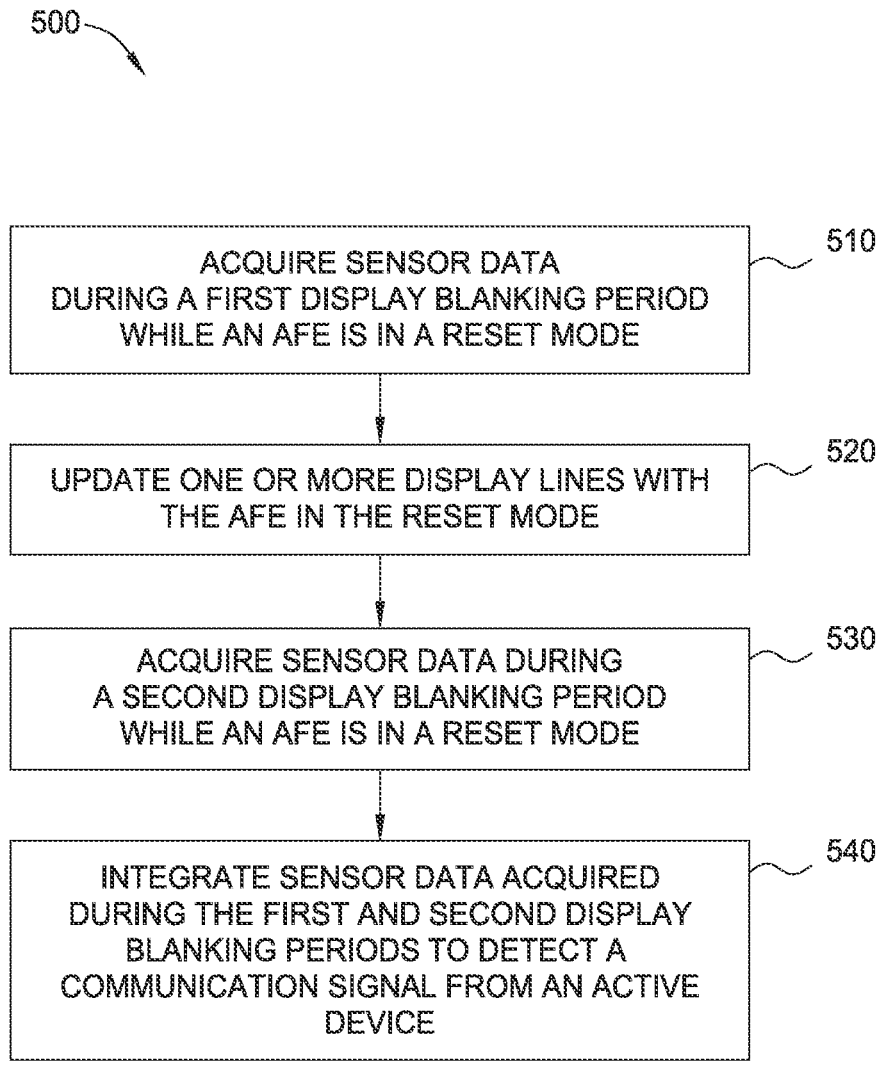
FIG. 5 is a flow diagram illustrating a method for operating an input device.

FIG. 5 is a flow diagram illustrating a method 500 for operating an input device. Although the method steps are described in conjunction with the systems of FIGS. 1-4, persons skilled in the art will understand that any system configured to perform the method steps, in any feasible order, falls within the scope of the present invention. In various embodiments, the hardware and/or software elements described above in FIGS. 1-4 can be configured to perform the method steps of FIG. 5. In some embodiments, the components illustrated in FIGS. 1-2, such as the sensor electrodes and AFE 270, may perform some or all of the steps in FIG. 5, utilizing hardware and/or software.

The method begins at step 510, where sensor electrodes acquire sensor data during a first display blanking period. An AFE 270 associated with the plurality of sensor electrodes is in a reset mode during the first display blanking period. While in the reset mode, the AFE 270 can collect a resulting signal from one or more sensor electrodes.

The method proceeds to step 520, where one or more display lines are updated after the first display blanking period. The AFE 270 remains in the reset mode after the first display blanking period.

At step 530, sensor electrodes acquire sensor data during a second display blanking period. The AFE 270 remains in the reset mode during the second display blanking period. While in the reset mode, the AFE 270 can again collect a resulting signal from one or more sensor electrodes. The method proceeds to step 540, where the AFE 270 integrates sensor data acquired during the first and second display blanking periods to detect a communication signal from an active device. The AFE 270 uses the resulting signals from the sensor electrodes, collected during the display blanking periods, to determine a change in capacitance, which in turn is used to detect the communication signal from the active device.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A processing system for a capacitive sensing device, comprising:

a sensor module comprising sensor circuitry configured to acquire sensor data using a first resulting signal received with at least one sensor electrode during a first half sensing period of a sensing period and a second resulting signal received with the at least one sensor electrode during a second half sensing period of the sensing period;

wherein:
the first half sensing period includes a first display blanking period and a first reset period;
the second half sensing period includes a second display blanking period and a second reset period;
the first reset period occurs between the first display blanking period and the second display blanking period and overlaps at least a first output display line period; and
the second reset period occurs between the second display blanking period and a third display blanking period and overlaps at least a second output display line period;

wherein the at least one sensor electrode comprises at least one display electrode of a plurality of display electrodes, and wherein the at least one display electrode is configured to be driven for display updating and capacitive sensing.

2. The processing system of claim 1, wherein the sensor module is further configured to detect a communication signal from an active device using the first resulting signal and the second resulting signal.

3. The processing system of claim 2, wherein the first display blanking period has a shorter duration than a transmission cycle of the communication signal generated by the active device.

4. The processing system of claim 1, wherein the sensor module comprises a receiver that is configured to enter a reset mode during the first reset period following the first display blanking period.

5. The processing system of claim 4, wherein the processing system further comprises a driver module that is configured to update one or more display lines while the receiver is in the reset mode.

6. The processing system of claim 4, wherein the sensor module is further configured to drive the at least one sensor electrode for capacitive sensing during a third blanking period following a second display update period, wherein the third blanking period is longer than the first or second blanking periods.

7. The processing system of claim 6, wherein the third blanking period is a vertical blanking period.

8. The processing system of claim 1, wherein the sensor module is configured to integrate the first and second resulting signals from the first half sensing period and the second half sensing period.

9. The processing system of claim 1, wherein acquiring sensor data comprises:
performing absolute capacitive sensing.

10. The processing system of claim 1, wherein acquiring sensor data comprises:
performing transcapacitive capacitive sensing.

11. A method for operating an input device, comprising:
acquiring sensor data using a first resulting signal received with a plurality of sensor electrodes during a first half sensing period of a sensing period, the first half sensing period includes a first display blanking period and a first reset period;
updating a first one or more display lines after the first display blanking period;
placing an analog front end in a reset mode during the first reset period overlapping with the updating of the first one or more display;
acquiring sensor data using a second resulting signal received with the plurality of sensor electrodes during a second half sensing period of the sensing period, the second half sensing period includes a second display blanking period and a second reset period;
updating a second one or more display lines after the first display blanking period; and
placing the analog front end in the reset mode during the second reset period overlapping with the updating of the second one or more display lines, wherein the first reset period occurs between the first display blanking period and the second display blanking period, and the second reset period occurs between the second display blanking period and a third display blanking period, and wherein each of the plurality of sensor electrodes comprises at least one display electrode of a plurality of display electrodes, and wherein the at least one display electrode is configured to be driven for display updating and capacitive sensing.

12. The method of claim 11, further comprising:
acquiring sensor data during a third display blanking period, wherein the third display blanking period is longer than the first or second display blanking period.

13. The method of claim 11, further comprising:
integrating sensor data acquired during the first and second display blanking periods to detect a communication signal from an active device.

14. The method of claim 13, wherein a transmission cycle of the communication signal from the active device is longer than the first display blanking period.

15. The method of claim 11, wherein acquiring sensor data comprises:
performing absolute capacitive sensing.

16. The method of claim 11, wherein acquiring sensor data comprises:
performing transcapacitive capacitive sensing.

17. An input device, comprising:
a plurality of sensor electrodes, wherein each sensor electrode comprises at least one display electrode of a display, and wherein each display electrode is configured to be driven for display updating and capacitive sensing; and
a processing system configured to:
acquire sensor data using a first resulting signal received with one or more sensor electrodes during a first half sensing period of a sensing period, the first half sensing period includes a first display blanking period and a first reset period;
enter a reset mode during the first reset period, the first reset period overlapping with a first display line update period following the first display blanking period;
acquire sensor data using a second resulting signal received with the one or more sensor electrodes during a second half sensing period of the sensing period, the second half sensing period includes a second display blanking period and a second reset period, and following the first display update period; and
enter the reset mode during the second reset period, the second reset period overlapping with a second display line update period following the second display blanking period, wherein the first reset period occurs between the first display blanking period and the second display blanking period, and the second reset period occurs between the second display blanking period and a third display blanking period.

18. The input device of claim 17, wherein the processing system is further configured to:
   acquire sensor data using the one or more sensor electrodes during a third display blanking period, wherein the third display blanking period is a longer than the first or second display blanking period.

19. The input device of claim 17, wherein the processing system is further configured to:
   integrate the acquired sensor data during the first and second half sensing to detect a communication signal from an active device.

20. The input device of claim 19, wherein the first display blanking period has a transmission cycle that is longer than the communication signal from the active device.

* * * * *

UNITED STATES PATENT AND TRADEMARK OFFICE
CERTIFICATE OF CORRECTION

PATENT NO. : 10,037,112 B2
APPLICATION NO. : 14/870251
DATED : July 31, 2018
INVENTOR(S) : Shepelev et al.

Page 1 of 1

It is certified that error appears in the above-identified patent and that said Letters Patent is hereby corrected as shown below:

In the Claims

In Column 14, Line 3, in Claim 11, delete "display;" and insert -- display lines; --, therefor.

Signed and Sealed this
Fifth Day of May, 2020

Andrei Iancu
*Director of the United States Patent and Trademark Office*